UNITED STATES PATENT OFFICE.

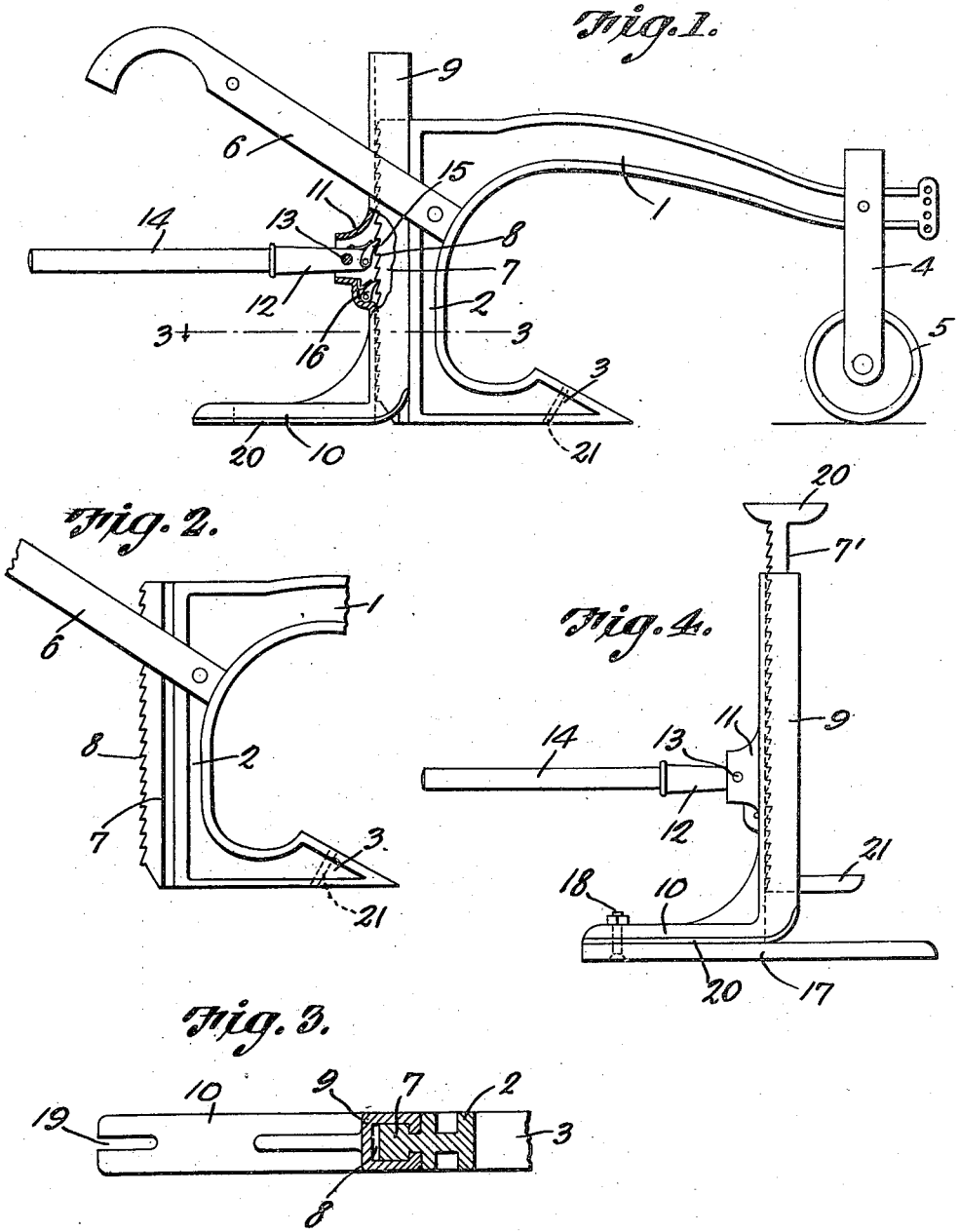
R. H. OWEN.
SUBSOIL AND GRUBBING PLOW.
APPLICATION FILED OCT. 2, 1916.
1,243,758.
Patented Oct. 23, 1917.
Witnesses
R. H. Owen  Inventor
by
Attorneys

RICHARD HENRY OWEN, OF LEXINGTON, NORTH CAROLINA.

SUBSOIL AND GRUBBING PLOW.

1,243,758.  Specification of Letters Patent.  Patented Oct. 23, 1917.

Application filed October 2, 1916. Serial No. 123,340.

*To all whom it may concern:*

Be it known that I, RICHARD H. OWEN, a citizen of the United States, residing at Lexington, in the county of Davidson and State of North Carolina, have invented a new and useful Subsoil and Grubbing Plow, of which the following is a specification.

The present invention appertains generally to plows, and relates especially to a subsoil and grubbing plow.

It is the object of the invention to provide a subsoil and grubbing plow having novel means for jacking the hook or plow point out of the ground when it becomes "hung," whereby to facilitate the tearing out of stumps, roots, and the like.

Another object of the invention is the provision in a subsoil and grubbing plow of a device which can be readily applied thereto and removed therefrom, and which when applied is operable for jacking the beam and the plow point or hook upwardly, the device also being simple, compact and inexpensive in construction, and serving its office in a thoroughly practical, convenient and efficient manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a side elevation of the improved subsoil and grubbing plow, portions being broken away and shown in section.

Fig. 2 is a fragmental side elevation illustrating the beam with the attachment removed.

Fig. 3 is a section on the line 3—3 of Fig. 1.

Fig. 4 is a side elevation of the attachment used as an ordinary jack.

The plow embodies a beam 1 of suitable construction, provided at its rear end with a standard 2 having a forwardly projecting hook or plow point 3 at its lower end for stirring up the subsoil and for grubbing roots, stumps, and the like, in the well known manner. The beam 1 has a standard 4 attached thereto adjacent to its forward end and carrying a ground wheel 5 to ride upon the ground to assist in guiding the plow, and to prevent the tilting thereof, especially when the plow point or hook 3 is being jacked out of the ground. Suitable handles 6 are attached to the beam 1 adjacent to its rear end.

The rear side of the standard 2 is provided with a vertical tongue 7 of T-shaped cross section and provided with a vertical series of transverse ratchet teeth 8. This tongue 7 provides means for the application of the attachment, which will be described presently.

The attachment embodies a standard 9 embracing the tongue 7 and guided for vertical movement thereby, the standard 9 being readily slid downwardly onto the tongue 7 into engagement therewith, and being readily removed therefrom. The standard 9 is provided at its lower end with a rearwardly projecting foot 10, and the standard is provided between its ends with a rearwardly projecting boss 11 provided with an opening receiving one end of a socketed lever 12 fulcrumed, as at 13, within the boss 11. The lever 12 is socketed for the reception of a handle 14 of suitable length, whereby to provide the proper leverage or purchase for jacking up the plow beam. A spring pressed pawl 15 is pivoted to the lever 12 to engage the teeth 8, and a second spring pressed pawl 16 is pivoted to the standard 9 to engage said teeth for supporting the beam when it is jacked up. When the lever 12 is oscillated, the pawl 15 in engaging the teeth 8, will raise the beam 1 step-by-step.

The plow can be used for subsoiling and grubbing without the attachment, although in some cases the attachment can be left on. Should the plow become hung by encountering a stump, root or other obstruction, the beam can be jacked out of the ground, for tearing out the obstruction. Thus, by applying the standard 9 to the tongue 7, and operating the handle 14, the foot 10 will rest upon the ground, and the beam will therefore be jacked upwardly to remove it from the ground together with the root or stump. The attachment can be readily removed.

The standard 9 when removed can be used as a part of an ordinary jack. Thus, a base plate 17 can be used for supporting the standard 9 by bolting the foot 10 of the standard upon the base plate, a bolt 18 being carried by the plate 17 adjacent one edge, and the end of the foot 10 being preferably provided with an open slot 19 for receiving the bolt 18. A lifting member 7', of somewhat the same formation as the tongue 7 is slidable within the standard 9 to be operated by the lever 12, and is provided at its upper end with a head 20 and at its lower end with an outstanding member 21 for supporting the object to be jacked up. The base plate 17 and lifting member 7' can be readily removed from the standard 9 in order that the standard can be applied to the plow beam.

The foot 10 can be provided with a removable and replaceable wear plate 20, and the plow point or hook 3 is provided with an aperture 21 for the reception of a bolt to clamp a shovel or blade upon said point or hook, if this is desired or necessary.

Having thus described the invention, what is claimed as new is:—

1. A plow having a vertical standard provided with a lower forwardly projecting plow point and a rear vertical portion, a standard slidably engaging said vertical portion for vertical movement and removable upwardly from said portion, the second mentioned standard having a rearwardly projecting foot at its lower end movable below the first mentioned standard and plow point, and means carried by the second mentioned standard engageable with said portion of the first mentioned standard for moving the first and second mentioned standards downwardly and upwardly, respectively, relatively to one another.

2. A plow having a vertical standard provided with a lower forwardly projecting plow point and a rear vertical toothed tongue, a standard slidably embracing said tongue for vertical movement, the second mentioned standard having a rearwardly projecting foot at its lower end movable below the first mentioned standard and plow point, and means carried by the second mentioned standard engageable with said tongue for moving the first mentioned and second mentioned standards downwardly and upwardly, respectively, relatively to one another.

In testimony that I claim the foregoing as my own, I have hereto affixed my signature in the presence of two witnesses.

RICHARD HENRY OWEN.

Witnesses:
C. A. HANES,
R. H. BIESECKER.

Copies of this patent may be obtained for five cents each, by addressing the "Commissioner of Patents, Washington, D. C."